United States Patent [19]
Baas

[11] Patent Number: 5,384,759
[45] Date of Patent: Jan. 24, 1995

[54] METHOD OF READING DATA OFF A ROTATING RECORDING MEDIUM

[75] Inventor: Dieter Baas, Kehl-Auenheim, Germany

[73] Assignee: Deutsche Thomson-Brandt GmbH, Villengen-Schwenningen, Germany

[21] Appl. No.: 103,143

[22] Filed: Aug. 9, 1993

[30] Foreign Application Priority Data

Feb. 9, 1991 [DE] Germany ............................. 4104041

[51] Int. Cl.$^6$ ............................................. G11B 17/22
[52] U.S. Cl. ........................................ 369/32; 369/47
[58] Field of Search ................. 369/32, 33, 47, 48, 369/49, 44.28; 360/72.1, 72.2, 77.2, 78.01

[56] References Cited

U.S. PATENT DOCUMENTS

| | | | |
|---|---|---|---|
| 4,817,075 | 3/1989 | Kikuchi et al. | 369/47 |
| 4,907,213 | 3/1990 | Baas | 369/47 |
| 5,001,689 | 3/1991 | Baas et al. | 369/32 |
| 5,235,578 | 8/1993 | Baas et al. | 369/32 |
| 5,293,568 | 3/1994 | Oshiba et al. | 369/32 |

OTHER PUBLICATIONS

Patent Abstract of Japan vol. 8 No. 228 (P0308) Jun. 21, 1984.

*Primary Examiner*—Robert J. Pascal
*Assistant Examiner*—Tan Dinh
*Attorney, Agent, or Firm*—Joseph S. Tripoli; Eric P. Herrmann; Ronald H. Kurdyla

[57] ABSTRACT

A method of reading recorded-data on a spiral data track of a rotating recording medium which is scanned by a radially moveable scanning device. The scanning device follows the spiral data track and appears to shift from one track to another. The directory data are divided into a plurality of directory data blocks and stored on the spiral data track. Each of the data blocks represents a different characteristic of the recorded-data and at least n+1 identical blocks for each characteristic are sequentially arranged on the spiral data track, n being a whole number. The directory data are read by moving the scanning device from one data block to another. The motion between data blocks occurs either along the same track, inwardly from one track to another, or outwardly from one track to another and therefore the scanning of all n+1 blocks for every characteristic is not necessary.

7 Claims, 4 Drawing Sheets

FIG. 1

METHOD OF READING DATA OFF A ROTATING RECORDING MEDIUM

This is a continuation of PCT application PCT/EP 92/00232 filed Feb. 4, 1992 by Dieter Baas and titled "Method Of Reading Data On A Rotating Recording Medium". This invention is directed to a method of reading the data from a rotating recording medium on which the data are recorded in a data track. The data are divided into blocks and in order to have redundancy at least two identical blocks are arranged successively on the data track. Such a method is advantageous is a compact disc player (CD) in order to accurately read the information directory from the rotating recording medium.

BACKGROUND OF THE INVENTION

A description of which data are stored on a compact disk and how they are processed by the CD player is presented in the article "Zusammenstellen eines CD-Programms" ("Assembling a CD Program") in "Funkschau" No. 15, Jul. 18, 1986, pp 26 through 28.

Every CD contains a directory which stores data about the number of program blocks on the disk, their start times, as well as the total playback time of the disk. The individual program blocks are normally musical items but they can be, for example, in the form of spoken words or various sound effects for dubbing flims or slides. Up to 99 program blocks can be stored on one CD, but a music CD normally only has 10 to 20 different musical items.

The CD directory has the data format illustrated in FIG. 1. The first block A0 stores the title of the first muscial item, the second block A1 stores the title of the final musical item, and the third block A2 stores the total playback time of the CD. The start times of the individual n musical items, which are stored on the disk, are stored in the subsequent data blocks D1 through Dn. In order to achieve redundancy, several identical blocks are provided. In the example shown in FIG. 1, three identical blocks are arranged in succession on the data track for each function stored. Three blocks A0 are followed by three blocks A1, three blocks A2, three blocks D1, three blocks D2, and so on until, finally, the last three blocks Dn form the end of the directory. After inserting a CD into a CD player, the CD's directory is read. The data present in the directory are stored in a memory of the CD player. Only after all the necessary directory data has been read and stored can the CD player begin to play back the individual musical items. Therefore, after having inserted a CD into a CD player for the purpose of playback, the CD listener must wait until the CD player has read the directory and stored the data. The time required by the CD player to do this, usefully called the read-in time, is an important feature in terms of the quality of a CD player.

SUMMARY OF THE INVENTION

It is an object of the invention to shorten the read-in time of a CD player in order to offer the CD listener greater convenience and also improve the quality of the player. The inventive method acheives this objective in that a reading device, after reading the data of one block, moves to another track in order to continue reading the data of another block. The data are recorded on a CD in a spiral track which is tracked by a scanning device. Accordingly, strickly speaking, there is only one track on a CD. However, as the scanner moves radially, particularily when travelling over songs to play a selected song, it appears to pass over many tracks. As used herein the latter sense in intended when the scanner is said to shift to another track.

BRIEF DESCRIPTION OF THE DRAWINGS

The invention is described with reference to the figures in which:

FIG. 1 shows the arrangement of data blocks for a redundant system in a straight line for ease of drawing;

DETAILED DESCRIPTION

Figure 1:
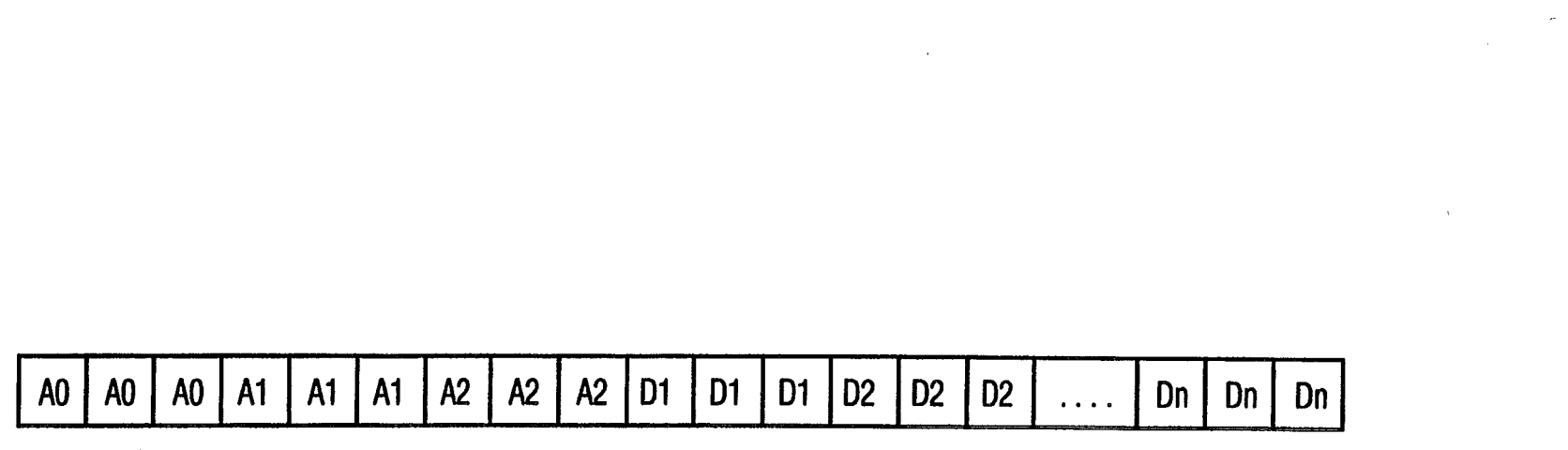
Figure 2:
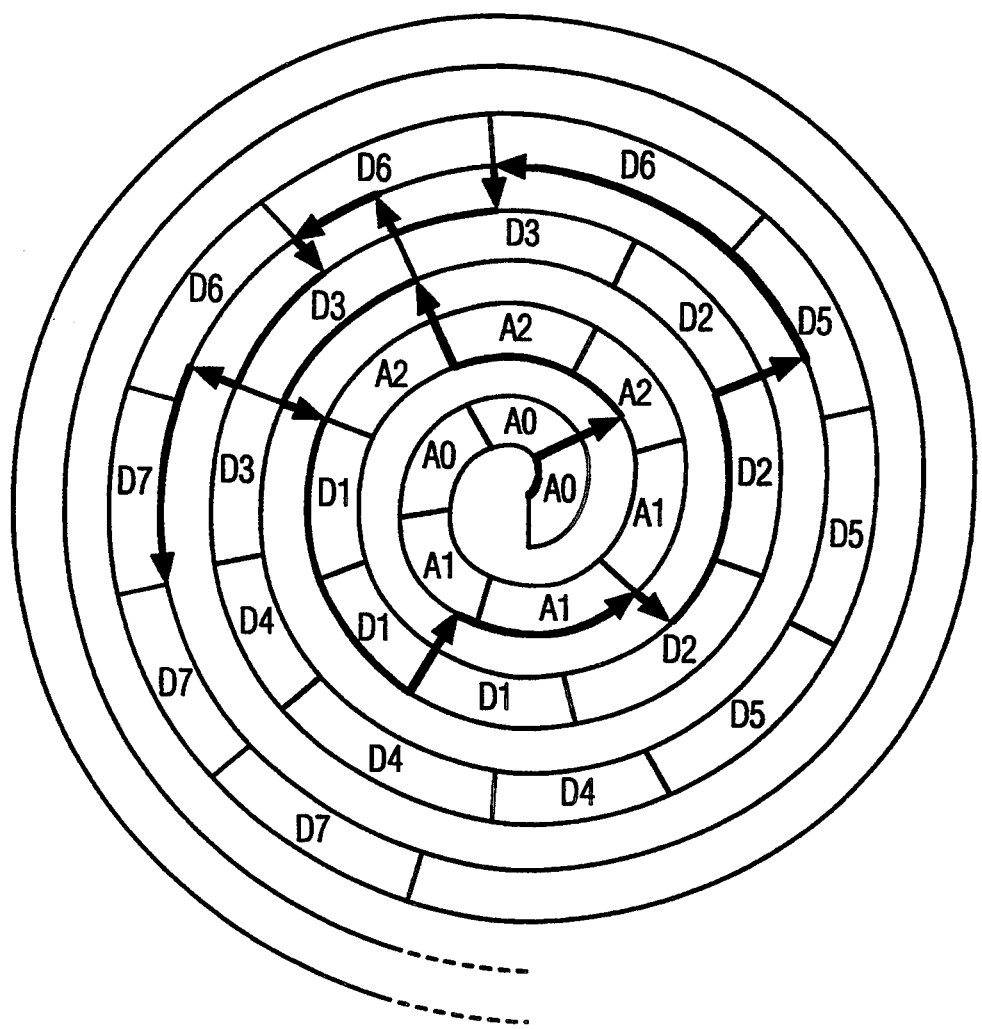
FIG. 2 is a first example of the shifting between the data blocks and tracks of a CD.

A helical data track of a CD is shown in FIG. 2. Similiar to the illustration in FIG. 1, three identical storage blocks for each of the directory functions A0, A1, A2, D1, D2, D3, D4, D5, D6 and D7 are arranged in succession on the helical data track. Therefore, the CD directory is redundantly recorded three times redundantly with these blocks. The individual musical items follow the final block D7. The optical scanning device of the CD player begins, for example, with the reading of the first A0 block and afterwards shifts one track radially outwardly to the approximate center of the second A2 block, the data form the partial block is not stored. It remains on this track to read and store the data from the second A2 block. The optical scanning device now shifts one track outward to the end of the first D3 block, and the data from the second D3 block B3 is read and stored. The optical scanning device then shifts one track radially inward to the start of the first D1 block. The optical scanning device continues to scan this track to read the second D1 block. Because the third D1 block follows and the D1 data are already stored the optical scanning device shifts one track radially inwardly to the first A1 block. The second A1 block is read and stored. Because another A1 block follows in this track, the optical scanning device shifts one track radially outwardly to the center of the first D2 block. The second D2 block is read. Because the third D2 block follows, the scanning device shifts one track outwardly to the early part of the third D5 block. Because block, the first D6 block follows the third D5 block, the scanning device remains on this track and reads the D6 block. However, another D6 block follows the first D6 block and the scanning device shifts one track inwardly to the D3 block, which has already been read. Therefore, the scanning device shifts one track outwardly to the second D6 block, which also already been read. However, because of the presence of the third D6 block, the scanning device shifts one track inwardly to the second D3 block, which has already been read. Accordingly the scanning device shifts one track outwardly to the end of the third D6 block, which is followed by the first D7 block. The scanning device remains in this track to read the D7 block. The optical scanning device has now read all blocks A0, A1, A2 and D1 through D7 in the following sequence: A0, A2, D3, D1, A1, D2, D5, D6, D7.

The time required to read and store the directory of a CD is considerably shortened by the inventive method of radially shifting inwardly or outwardly to another track if a block which has already been read follows the block being scanned. That is, the scanner stays on the same track when the next data block has not been read and alternately shifts inwardly and outwardly when the next block has been read. Accordingly, not all blocks are read three times, as is the case with the prior art where the scanning device travels from the inside to the outside along the helical data track to sequentially read all blocks.

Figure 3:
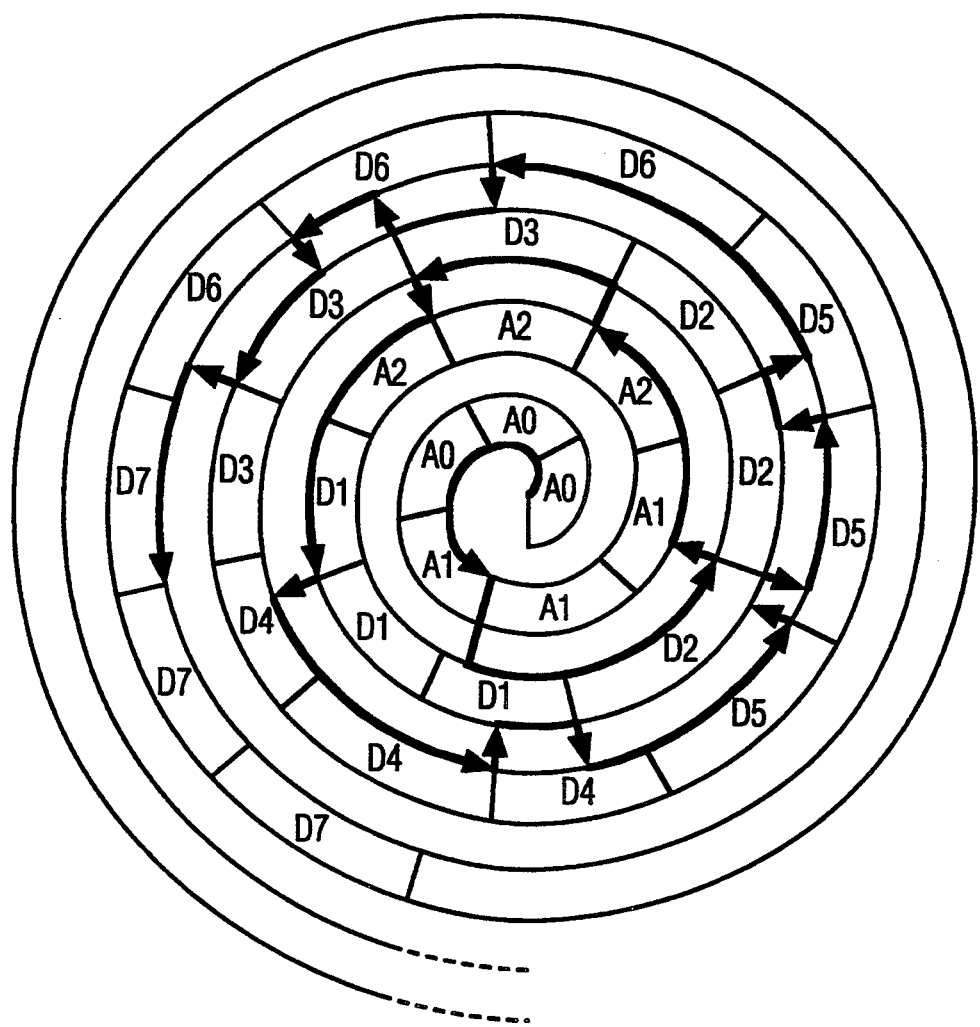
FIG. 3 is a second example of the shifting between the data blocks and tracks of a CD.

In FIG. 3, the scanning device reads all three A0 blocks A0 as well as the first A1 block. The scanning device shifts one track outwardly to the first quarter of the third D1 block. It remains in this track and reads the first D2 block. The scanning device shifts one track inwardly to the first third of the third A1 block. The first A2 block A2 follows the third A1, which is read. The scanner shifts one block outwardly to the end of the third D2 block, which has already been read. The first D3 block is in the same track and is read. The scanning device again shifts one track inwardly to the start of the third A2 block. After the end of the third A2 block the scanning device remains in the same track to read the first D1 block, after which the scanning device shifts one track outwardly to the first first quarter of the first D4 block. The second D4 block D4 is read and the scanner moves one track inwardly to the approximate center of the third D1 block D1, which was read earlier. Because the third D1 block D1 is followed by a D2 block which has already been read, the scanning device shifts one track outwardly to the final third of the third D4 block, which also has already been read. However, the first D5 block follows the third D4 block and is read. The scanning device then shifts one track inwardly to the first D2 block. At the end of the first block D2 the scanning device shifts one track outwardly because the D2 data have already been read and stored. The second D5 block is scanned. However, the D5 data was stored earlier. Therefore, upon reaching the end of the second D5 block the scanning device shifts one track inwardly to the final third of the second D2 block D2, tt the end of which it again shifts outwardly because another D2 block follows. The scanner moves along the final half of the third D5 block to read the first D6 block which is on the same track. At the end of the first D6 block D6 the scanning device shifts one track radially inwardly to the approximate center of the first D3 block, the contents of which have already been stored. At the end of the first D3 block the scanning device shifts one track outwardly to the first D6 block because another D3 block follows the first D3 block. At the end of the second D6 block the scanner shifts inwardly to the approximate center of the third D3 block D3. However, the D3 data have already been read and stored and the scanner shifts one track outwardly at the end of the D3 block to the approximate end of the third D6 block. The first D7 block follows and because the D7 data have not yet been read and stored the scanning device remains in this track and reads block D7 data. The scanning device has now read all blocks in the following sequence: A0, A1, D2, A2, D3, D1, D4, D5, D6 and D7.

Figure 4:
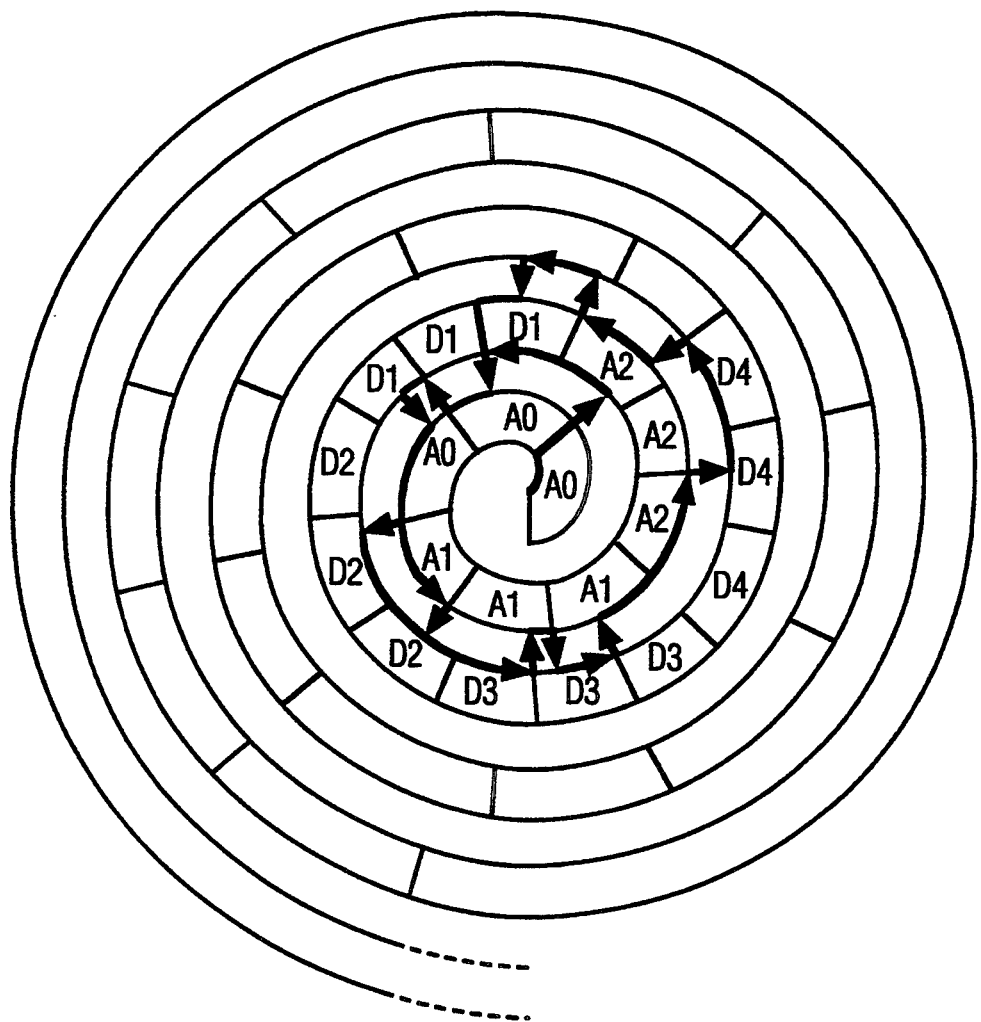
FIG. 4 is a third example of the shifting between the data blocks and tracks of a CD.

In FIG. 4, a total of just seven different blocks, the lengths of which are selected to be different are redundantly arranged on the CD. The scanning device reads the first A0 block and shifts one track outwardly to the center of the third A2 block. The scanner remains in this track and reads the first D1 block after which it shifts one track inwardly to the second half of the second A0 block. At the end of the second A0 block A0 it shifts one track outwardly because the third A0 block follows and the data have already been stored. However, with this shift the scanning device is on the third D1 block it therefore shifts one track inwardly to the third A0 block A0, at the end of which the scanning device reads the first A I block. An outward one track shift is made at the end of the first A1 block to land it near the center of the third D2 block. The first D3 block is read and the scanning device shifts one track inwardly to the vicinity of the end of the second A1 block. However, because the contents of the A1 block have already been read and stored, at the end of the second A1 block the scanning device shifts one track outwardly to the approximate center of the second D3 block, the contents of which have also already been read and stored. Therefore, the scanning device again shifts one track inwardly to the approximate the first half of the last A1. However, because the first A2 block has not yet been read, and because it follows the third A1 block, the scanning device reads the first A2 block. The scanning device then shifts one track outwardly to the approximate center of the second D4 block D4. The adjajcent D4 block is read because this block has not yet been read. At the end of the third D4 block the scanning device shifts one track inwardly to the third A2 block. The dcanning device then shifts one track outwardly because the D1 data have already been stored. However, because there are no more blocks to be read on this track, the scanning device shifts one track inwardly to the center of the first D1 block, which also has already read. Therefore, at the end of the first D1 block the scanning device shifts one track inwardly to the center of the second A0 block. At the end of the second A0 block the scanning device shifts one track outwardly to the start of the third D1 block, which also has already been read. Therefore, the scanning device shifts one track inwardly to the third A0 block, at the end of which a one track outward shift is made to the second D2 block because the first A1 block follows and has been read. The scanning device from the end of the second block D2 to the third D2 block and stores the D2 data. The scanning device has now read all the blocks A0. A1, A2 and D1 through D4 in the following sequence: A0, D1, A1, D3, A2, D4 and D2.

The sequence of the individual track shifts of the scanning device finally for a particular CD is dependant upon the total number of blocks, the number of redundant blocks and the length of the individual blocks. The greater the redundancy. That is the greater the number of identical blocks there are on the disk, the greater the resulting time saving with the inventive method.

The inventive method is generally suitable for reading the data of a rotating recording medium on which the data are redundantly recorded in concentric circles or helical data tracks and are divided into blocks individually representing a characteristic of the data. Several identical blocks of each characteristic are sequentally arrange on the data track. The inventive is particularly advantageous when employed in a CD player or video disk player for reading the directory of the audio or video disk.

I claim:

1. A method of reading recorded-data on a spiral data track of a rotating recording medium which is scanned by a radially moveable scanning device, said scanning device following said spiral data track and appearing to shift from one track to another, and in which directory data are divided into a plurality of directory data blocks and stored on said spiral data track, each of said data blocks representing a different characteristic of said recorded-data and at least n+1 identical blocks for each characteristic are sequentially arranged on said spiral data track, where n is a whole number greater than or equal to 1, comprising the steps of:

reading said directory data by moving said scanning device from one data block to another, the motion between data blocks occurring either along the same track, inwardly from one track to another, or outwardly from one track to another, whereby the scanning of all n+1 blocks for every characteristic is not necessary.

2. A method of reading recorded-data, on a spiral data track of a rotating recording medium which is scanned by a radially moveable scanning device, said scanning device following said spiral data track and appearing to shift from one track to another, and in which directory data are divided into a plurality of directory data blocks and stored on said spiral data track, each of said data blocks representing a different characteristic of said recorded-data and at least n+1 identical blocks for each characteristic are sequentially arranged on said spiral data track, where n>1 said method comprising the steps of:

reading said directory data by moving said scanning device from one data block to another, the motion between data blocks occurring either along the same track, inwardly from one track to another, or outwardly from one track to another, whereby the scanning of all n+1 blocks for every characteristic is not necessary.

3. The method of claim 2 wherein said scanning device shifts tracks only when the next block on the track has been read.

4. The method of claim 3 wherein said scanning device alternately shifts inwardly and outwardly.

5. The method of claim 1 wherein said scanning device alternately shifts inwardly and outwardly.

6. The method of claim 1 wherein said scanning device shifts tracks only when the next block on the track has been read.

7. The method of claim 6 wherein said scanning device alternately shifts inwardly and outwardly.

* * * * *